July 7, 1953
C. E. EARLE ET AL
2,644,480
FLUID VALVE
Filed Oct. 27, 1948
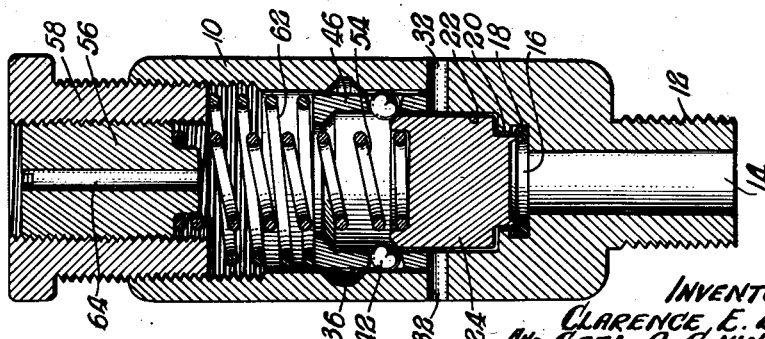
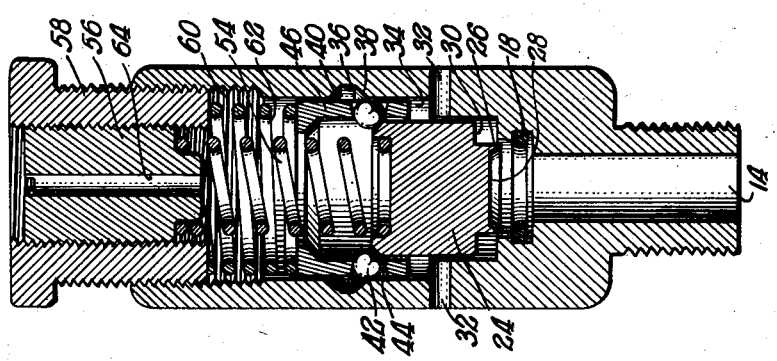
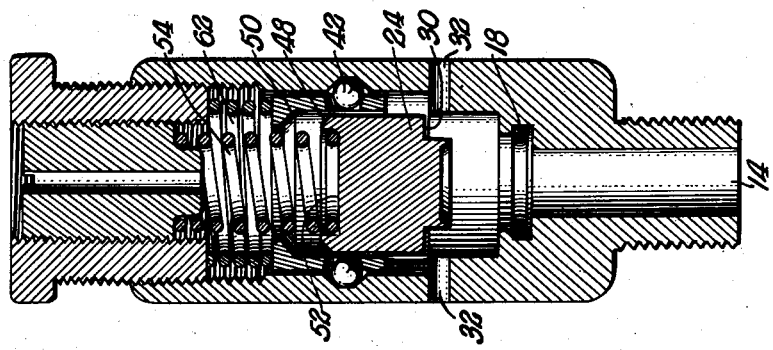
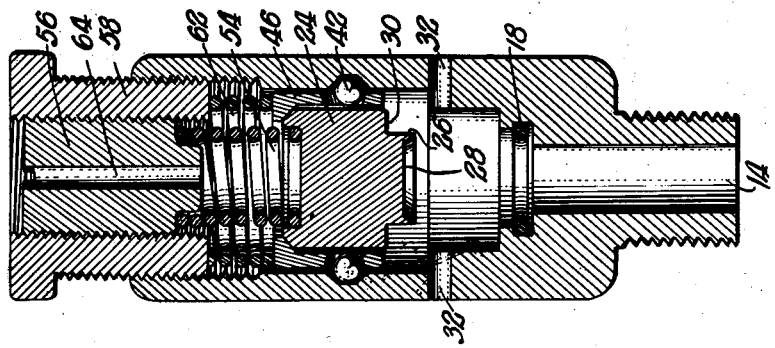
INVENTORS:
CLARENCE E. EARLE,
AND CARL A. COVINGTON,
BY Raymond W. Colton
ATTORNEY Patented July 7, 1953

2,644,480

UNITED STATES PATENT OFFICE 2,644,480

FLUID VALVE

Clarence E. Earle, Washington, D. C., and Carl A. Covington, Alexandria, Va.

Application October 27, 1948, Serial No. 56,748

16 Claims. (Cl. 137—469)

1

This invention relates to fluid valves adapted for use as pop valves, pressure regulators, pressure reducers, and pulsators, and is applicable to various other differential pressure responsive apparatus. It is particularly well suited for installations where response to small pressure differentials is necessary and where rapid opening and closing of ports at rather definite pressure values is important.

The patented art is replete with disclosures of pressure responsive valves which present a relatively small area exposed to inlet pressure while the valve is closed, and a relatively larger area when the valve is open, for the purpose of opening at one predetermined pressure and closing at a different predetermined pressure. In accordance with the present invention, the advantages of such devices have been adopted and carried farther by providing a snap action for both the opening and closing phases of their operating cycles.

The fluid valve of the present invention comprises a housing, a valve seat in the housing, a body reciprocable in the housing to and from engagement with the seat, biasing means urging the body towards engagement with the seat, and latching means actuated by the body during its travel to modify the effect of the biasing means on the body. The latching means is alternately actuated and released by the travel of the body, becoming effective upon travel of the body in one direction and ineffective upon travel of the body in the other direction. The valve seat itself is preferably capable of limited reciprocation in the housing to the end that during an opening operation, the seat will travel a short distance with the valve body before separation and during a closing operation, the seat will travel a short distance with the body to effect a more positive seat. The seat may assume the form of a rubber or rubber-like annulus and may be toroidal. The biasing means for the valve body may be defined by a plurality of concentric springs, one of which continuously urges the body towards engagement with the seat and another of which intermittently urges the body towards its seat, the effect of the second of these springs being nullified when the body has departed from its seat to a predetermined extent. The biasing means or springs are rendered adjustable in order that the valve can be calibrated to fulfill the requirements of a particular installation.

The body is preferably received in a sleeve which is also reciprocable in the housing, the sleeve having one or more tapered detent pockets

2 penetrating its wall for the reception of a corresponding number of detent elements which ordinarily ride against the internal wall of the housing and project internally of the sleeve sufficiently to obstruct movement of the body in one direction with respect to the sleeve. A recess for the detent or ball elements, provided at a suitable portion of the housing permits the detent to move outwardly until the sleeve is no longer obstructed whereupon the body can move with respect to the sleeve and simultaneously latch the sleeve with respect to the housing during a predetermined further movement of the body. Since one of the biasing springs contemplated bears directly upon the sleeve, its effect will be removed with respect to the body so long as the sleeve is latched with respect to the housing. An abutment on the body for engagement with the detent elements is preferably tapered to urge the elements outwardly into the recess, and similarly, the recess is defined by at least one tapered wall for urging the detent elements inwardly during relative motion of the sleeve in one direction. The sleeve may also provide a limiting stop for cooperation with the body abutment.

The arrangement of the inlet port, outlet port and resilient seat may be such that movement of the body in one direction sequentially opens the inlet port, exposes the larger area of the body to inlet port pressure, opens the outlet port, and actuates the latching mechanism to remove a portion of the biasing effect. Movement of the body in the other direction may sequentially release the latching means, close the outlet port, reduce the area of the body exposed to inlet port pressure and close the inlet port.

A more complete understanding of the invention will follow from a detailed description of the accompanying drawings wherein:

Fig. 1 is a sectional elevation exemplifying the invention as applied to a pop valve; and Figs. 2, 3 and 4 are sectional elevations similar to Fig. 1 depicting the positions assumed by the parts at various stages during an operating cycle.

The housing 10 is provided with external threads 12 at its lower end which defines an inlet port 14 for fluid whose pressure it is desired to control. The housing is provided with an internal counterbore 16 for reception of a toroidal rubber or rubber-like seat 18 whose longitudinal dimension is somewhat smaller than that of the counterbore to permit limited reciprocatory movement of the seat with respect to the housing. An internal shoulder 20 separates the counterbore 16 from a second counterbore 22 in which the valve body 24 is received for reciprocation. The lower edge 26 of the body is reduced to provide a relatively sharp edge for cooperation with the flexible seat 18 so that when the valve is in its closed position as depicted in Fig. 1, a relatively small area 28 is exposed to the inlet port pressure. The valve body is provided with a step 30 defining a relatively larger area for exposure to inlet port pressure as depicted in Figs. 2, 3 and 4.

Radial outlet ports 32 formed through the wall of the housing are controlled by the valve body, which has completely uncovered them in the positions shown in Figs. 3 and 4. Above the outlet ports, the body contains a larger counterbore 34 containing an intermediate groove 36 providing inclined walls 38 and 40 for the reception of detent balls 42 carried by inwardly convergent pockets 44 penetrating the wall of a sleeve 46 which is internally bored to receive the body 24. The upper end of the body is provided with an inclined surface 48 which bears against the detent balls 42 during a portion of the operation and against a complementary inclined surface 50 formed internally at the upper portion of the sleeve 46 during another phase of the operation. The upper end of the body is also provided with a recess 52 which serves as a seat for the lower end of a biasing spring 54 whose upper end bears upon an adjustable stop 56 threadedly received by an adjustable nut 58 which is in turn adjustably received by the threads 60 formed internally at the upper end of the housing 10. A second biasing spring 62 is interposed between the lower end of the adjustable nut 58 and the upper surface of the sleeve 46. The adjustable stop 56 is provided with a central perforation 64 extending therethrough to serve as a vent for the upper portion of the housing to avoid damping of the valve body.

Fig. 1 represents the parts in the positions assumed when the valve is closed. When the pressure applied to the relatively reduced area 28 of the valve body exceeds the value for which the biasing springs are calibrated and adjusted by their threaded elements 56 and 58, the valve body 24 and the reciprocable seat 18 will start to move upwardly, as viewed in the drawings, and since the balls 42 obstruct the body 24 against relative movement in the sleeve 46, the sleeve will move correspondingly, with the result that the moving system will be opposed by both of the biasing springs 54 and 62. When the resilient seat 18 reaches the limit of its reciprocation as defined by the shoulder 20, further upward movement of the valve body and its latching means defined by the detents 42 carried by the sleeve 46, will produce a relationship of parts similar to that depicted by Fig. 2 where the balls 42 are being urged outwardly by the inclined surface 48 at the upper end of the valve body so that the balls will enter the recess 36 defined in the housing wall as soon as registry has been attained.

After such registry occurs, the balls will move outwardly to the positions shown in Fig. 3 and will be restrained against inward movement so long as the valve body obstructs the pockets 44. Under these conditions the effect of the spring 62 upon the valve body will be nullified so that the only biasing force to be overcome by the fluid under pressure is that imposed by the spring 54. Further movement of the valve body can continue until the stop defined by the inclined surface 50 of the sleeve is engaged by the complementary surface 48 on the body, a condition which has been depicted in Fig. 4.

It will be recognized that an opening movement of the valve body will be greatly accelerated upon removal of the biasing force of the spring 62 from the body, which, as depicted in the drawings, will occur before the outlet ports 32 have been uncovered by the body.

When the inlet port pressure has dropped to the predetermined value for which the valve has been designed and adjusted to close, the valve body 24 starts to descend, from the position depicted in Fig. 4, under the influence of the spring 54, through the position depicted in Fig. 3; the body continues to move downwardly uncovering the sleeve pockets 44, whereupon the balls 42 riding on the inclined wall 38 of the housing recess 36 will move inwardly under the effect of the spring 62, into contact with the upper end of the valve body which will then continue downwardly at an accelerated rate under the supplemental force of the spring 62, causing the lower edge of the valve body to engage the seat 18 with which it continues to move until the downward travel has reached its limit and a firm seal has been established by the impact.

Applications of this invention have been highly successful even where the pressure differentials have been of the order of a small fraction of a pound per square inch. The operation of the valve is inherently rapid in both directions of travel, producing a snap action during both its opening and closing phases. Thus both lag and wire-drawing can be reduced appreciably and over regulation prevented to a marked degree.

Whereas the invention has been exemplified as applied to a pop valve, many variations and modifications beyond those described will occur to those skilled in the art just as they have been recognized already by the present inventors. Accordingly, the invention should not be limited to the apparatus selected for illustration beyond the scope of the appended claims.

We claim:

1. A fluid valve comprising a housing, a valve seat in said housing, a body reciprocable in said housing to and from engagement with said seat, abutment means carried by said housing fixed relative to said body, biasing means interposed between said abutment means and body continuously urging said body towards engagement with said seat, and latching means alternately actuated and released by said body during its travel to modify the effect of said biasing means on said body.

2. A fluid valve comprising a housing, a valve seat in said housing, a body reciprocable in said housing to and from engagement with said seat, abutment means carried by said housing fixed relative to said body, biasing means interposed between said abutment means and body continuously urging said body towards engagement with said seat, and latching means rendered ineffective by said body during its travel in one direction to modify the effect of said biasing means on said body.

3. A fluid valve comprising a housing, said housing containing a counterbore of substantially uniform section, a valve seat reciprocable in said counterbore, a body reciprocable in said housing to and from engagement with said seat, biasing means continuously urging said body towards engagement with said seat, and latching means actuated by said body during its travel to modify the effect of said biasing means on said body.

4. A fluid valve comprising a housing, a valve seat in said housing, a body reciprocable in said housing to and from engagement with said seat, abutment means carried by said housing fixed relative to said body, a plurality of biasing means interposed between said abutment means and body including at least one continuously urging said body towards engagement with said seat, and latching means actuated by said body during its travel to remove the effect of one of said biasing means on said body.

5. A fluid valve comprising a housing, a valve seat in said housing, a body reciprocable in said housing to and from engagement with said seat, abutment means carried by said housing fixed relative to said body, a biasing spring interposed between said abutment means and body continuously urging said body towards engagement with said seat, a second biasing spring intermittently urging said body towards engagement with said seat, and latching means actuated by said body during its travel to control the effect of said second biasing means on said body.

6. A fluid valve comprising a housing, a valve seat in said housing, a body reciprocable in said housing to and from engagement with said seat, abutment means carried by said housing fixed relative to said body, a plurality of biasing means interposed between said abutment means and body including at least one continuously urging said body towards engagement with said seat, adjustment means for said biasing means and latching means actuated by said body during its travel to modify the effect of one of said biasing means on said body.

7. A fluid valve comprising a housing, a valve seat in said housing, a sleeve reciprocable in said housing, a body received in said sleeve and reciprocable in said housing to and from engagement with said seat, biasing means effective in all positions of said body urging said sleeve and body towards said seat, and means actuated by said body during its travel to secure said sleeve against movement with respect to said housing.

8. A fluid valve comprising a housing, a valve seat in said housing, a sleeve reciprocable in said housing, a body reciprocable in said sleeve and in said housing to and from engagement with said seat, biasing means urging said sleeve towards said seat, biasing means urging said body towards engagement with said seat, and latching means carried by said sleeve actuated by said body during its travel for cooperation with said housing to modify the effect of the first said biasing means.

9. A fluid valve comprising a housing having an inlet port and an outlet port, a valve seat in said housing intermediate said ports, a body reciprocable in said housing to and from engagement with said seat, said body having an area exposed to inlet port pressure when seated and a larger area exposed to said pressure when unseated, biasing means continuously urging said body towards engagement with said seat, and latching means actuated by said body during its travel to modify the effect of said biasing means on said body, movement of said body in one direction sequentially opening said inlet port, exposing said larger area to inlet port pressure, opening said outlet port and actuating said latching means.

10. A fluid valve comprising a housing having an inlet port and an outlet port, a valve seat in said housing intermediate said ports, a body reciprocable in said housing to and from engagement with said seat, said body having an area exposed to inlet port pressure when seated and a larger area exposed to said pressure when unseated, biasing means continuously urging said body towards engagement with said seat, and latching means actuated by said body during its travel to modify the effect of said biasing means on said body, movement of said body in one direction sequentially actuating said latching means, closing said outlet port, reducing the body area exposed to inlet port pressure, and closing said inlet port.

11. A fluid valve comprising a housing, a valve seat in said housing, a sleeve reciprocable in said housing, a body reciprocable in said sleeve to and from engagement with said seat, biasing means urging said sleeve and body towards said seat, latch means including a detent restraining said sleeve and body against relative movement in one direction, and means provided by said housing to release said restraining means at a predetermined departure of said body with respect to said seat.

12. A fluid valve comprising a housing, a valve seat in said housing, a sleeve reciprocable in said housing, a detent pocket penetrating said sleeve, a detent received in said pocket normally projecting beyond said pocket and obstructing said sleeve internally, said housing providing a recess for reception of said detent upon displacement from said obstructing condition, a body reciprocable in said sleeve to and from engagement with said seat, an abutment carried by said body for engagement with said detent, and biasing means urging said body and sleeve towards said seat, said sleeve moving with said body while said detent obstructs said sleeve, said body moving relative to said sleeve upon displacement of said detent into said recess.

13. A fluid valve comprising a housing, a valve seat in said housing, a body reciprocable in said housing to and from engagement with said seat, biasing means urging said body towards engagement with said seat, detent means reciprocable in said housing for cooperation with said housing and body, and an abutment provided by said body for shifting said detent means during its travel to modify the effect of said biasing means on said body.

14. A fluid valve comprising a housing, a valve seat in said housing, a body reciprocable in said housing to and from engagement with said seat, biasing means continuously urging said body towards engagement with said seat, and a ball detent actuated by said body during its travel to reduce the effect of said biasing means on said body.

15. A fluid valve comprising a housing, a valve seat in said housing, a sleeve and a body received thereby reciprocable in said housing, biasing means urging said sleeve and body towards said seat, and a ball detent carried by said sleeve interposed in the path traversed by said body as it moves from said seat, said housing providing a recess to receive said detent during a predetermined portion of the travel of said body to reduce the effect of said biasing means on said body.

16. A fluid valve comprising a housing, a valve seat in said housing, a body freely reciprocable in said housing at all times to and from engagement with said seat, concentric springs urging said body towards engagement with said seat, and latching means cooperating with said housing actuated by movement of said body during its travel to nullify the effect of the other of said springs on said body.

CLARENCE E. EARLE.
CARL A. COVINGTON.

References Cited in the file of this patent

UNITED STATES PATENTS

| Number | Name | Date |
|---|---|---|
| Re. 17,022 | Wilson | July 3, 1928 |
| 1,124,203 | Bingley | Jan. 5, 1915 |
| 1,624,130 | Beygs | Apr. 12, 1927 |
| 1,770,912 | Clapp | July 22, 1930 |
| 1,808,212 | Earl | June 2, 1931 |
| 2,030,143 | Giger | Feb. 11, 1936 |
| 2,248,807 | Carlson | July 8, 1941 |
| 2,306,029 | Salzer | Dec. 22, 1942 |
| 2,332,630 | Fawkes | Oct. 26, 1943 |

FOREIGN PATENTS

| Number | Country | Date |
|---|---|---|
| 439,602 | Great Britain | Dec. 10, 1935 |